United States Patent
Ishikawa

(10) Patent No.: US 8,862,389 B2
(45) Date of Patent: Oct. 14, 2014

(54) DISPLAY SYSTEM, DISPLAY METHOD, AND DISPLAY PROGRAM

(71) Applicant: Ken Ishikawa, Nagoya (JP)

(72) Inventor: Ken Ishikawa, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 6 days.

(21) Appl. No.: 13/708,470

(22) Filed: Dec. 7, 2012

(65) Prior Publication Data
US 2013/0151145 A1      Jun. 13, 2013

(30) Foreign Application Priority Data

Dec. 13, 2011   (JP) ................................. 2011-272829

(51) Int. Cl.
  *G01C 21/00*   (2006.01)
  *G01C 21/36*   (2006.01)
  *G08G 1/0962*  (2006.01)
  *G08G 1/16*    (2006.01)

(52) U.S. Cl.
  CPC ........ *G01C 21/3667* (2013.01); *G08G 1/09626* (2013.01); *G08G 1/167* (2013.01)
  USPC ........... 701/428; 701/400; 701/409; 701/410; 340/995.1; 340/995.14; 340/995.17; 340/995.27

(58) Field of Classification Search
  CPC ................................ G01C 21/00; G01C 21/36
  USPC .............. 701/428, 400, 409, 410; 340/995.1, 340/995.14, 995.17, 995.27
  See application file for complete search history.

(56) References Cited

U.S. PATENT DOCUMENTS

| | | | | |
|---|---|---|---|---|
| 5,416,478 A | * | 5/1995 | Morinaga | 340/995.27 |
| 2005/0149262 A1 | * | 7/2005 | Oikubo | 701/211 |
| 2006/0031008 A1 | * | 2/2006 | Kimura et al. | 701/208 |

FOREIGN PATENT DOCUMENTS

JP     A-10-281795      10/1998

* cited by examiner

*Primary Examiner* — Fadey Jabr
*Assistant Examiner* — Martin Weeks
(74) *Attorney, Agent, or Firm* — Oliff PLC

(57) ABSTRACT

Display systems, methods, and programs generate and display an arrow object superimposed on an actual image of a road ahead of a vehicle. The systems, methods, and programs access information about a lane change route for guiding the vehicle when changing from a travel lane to a recommended lane. The systems, methods, and programs generate and display a travel lane part of the arrow object, a crossing part of the arrow object, and a recommended lane part of the arrow object, each as a superimposed image on the recommended lane. As remaining distance from a current position of the vehicle to the junction becomes smaller, a distance of a directional component along the travel lane for at least one of the travel lane part, the crossing part, and the recommended lane part is shortened.

10 Claims, 5 Drawing Sheets

DISPLAY SYSTEM, DISPLAY METHOD, AND DISPLAY PROGRAM

The disclosure of Japanese Patent Application No. 2011-272829, filed on Dec. 13, 2011, including the specification, drawings and abstract, is incorporated herein by reference in its entirety.

BACKGROUND

1. Related Technical Fields

Related technical fields include display systems, display methods, and display programs.

2. Related Art

As one of the technologies for use in an in-vehicle navigation device for guiding a driver to a destination, the following navigation device is proposed. When a driver is required at a junction to change the lane in order to travel in the direction to a destination, the navigation device creates a lane-changing guide graphic based on the data on the detected shape of the road ahead of the current position and superimposes the created guide graphic on the image of the road ahead of the vehicle. In this case, if the driver does not change the lane even after the guide graphic is displayed, the tip of the guide graphic extends in the direction to the destination to prompt the driver to change the lane (for example, paragraph 0032 and FIG. 11 in Japanese Patent Application Publication No. 10-281795 (JP 10-281795 A).

SUMMARY

However, if a driver does not change the lane even after a guide graphic is displayed, the navigation device in the related art described above simply extends the tip of the guide graphic in the direction to a destination. Therefore, with this navigation device, the driver cannot intuitively understand that the vehicle is approaching a junction. This means that the navigation device cannot appropriately prompt the driver to change the lane.

In view of the foregoing, exemplary implementations of the broad principles described herein provide a display system, a display method, and a display program that make it easy for a driver to intuitively understand that the vehicle is approaching a junction.

Exemplary implementations provide display systems, methods, and programs that generate and display an arrow object superimposed on an actual image of a road ahead of a vehicle. The systems, methods, and programs access information about a lane change route for guiding the vehicle when changing from a travel lane to a recommended lane. The systems, methods, and programs generate and display a travel lane part of the arrow object as a superimposed image on the travel lane, generate and display a crossing part of the arrow object as a superimposed image traversing from the travel lane to the recommended lane, and generate and display a recommended lane part of the arrow object as a superimposed image on the recommended lane. The systems, methods, and programs change a shape of the displayed arrow object such that, as a remaining distance from a current position of the vehicle to the junction becomes smaller, a distance of a directional component along the travel lane for at least one of the travel lane part, the crossing part, and the recommended lane part is shortened.

DETAILED DESCRIPTION OF EXEMPLARY IMPLEMENTATIONS

Examples of a display system, a display method, and a display program will now be described below in detail with reference to the drawings.

1. Configuration

Figure 1:
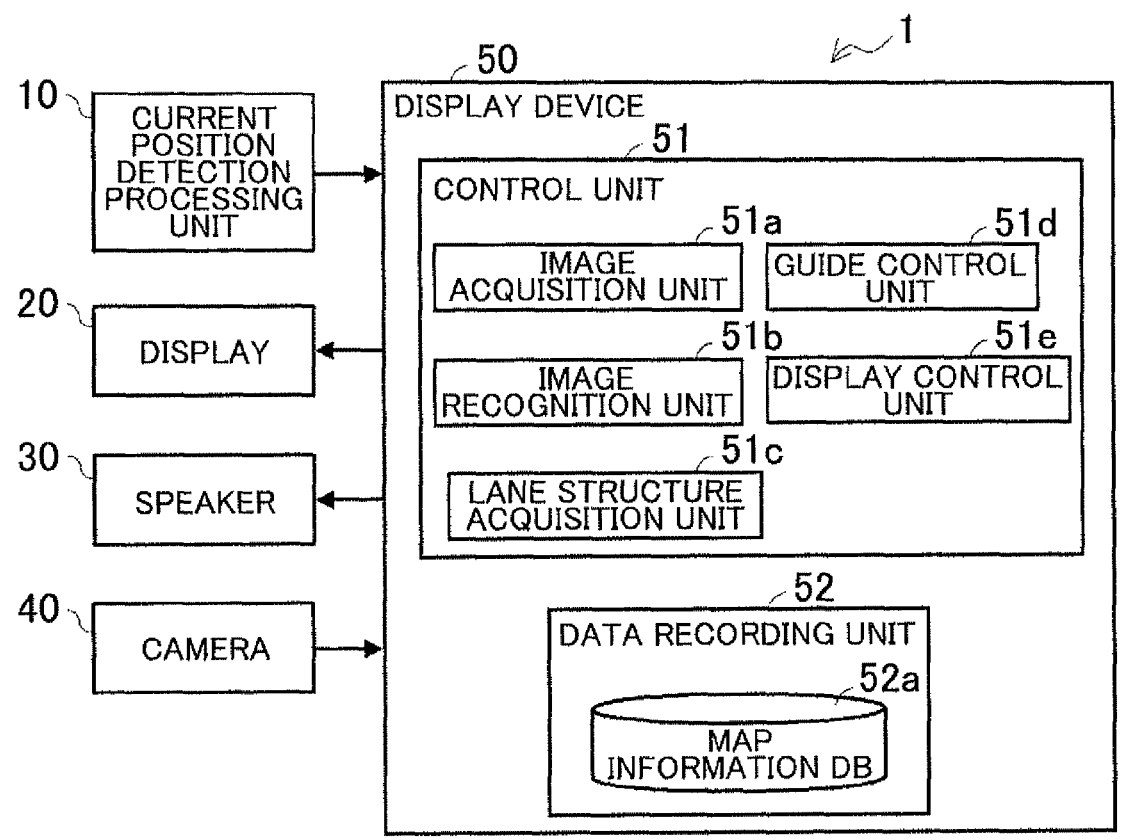
FIG. 1 is a block diagram showing an example of a display system in an example.

First, the following describes a configuration of a display system in this example. FIG. 1 is a block diagram showing an example of the display system in this example. As shown in FIG. 1, a display system 1 includes a current position detection processing unit 10, a display 20, a speaker 30, a camera 40, and a display device 50.

A. Current Position Detection Processing Unit

The current position detection processing unit 10 is a current position detection unit that detects the current position of a vehicle in which the display system 1 is mounted (hereinafter called a host vehicle). More specifically, the current position detection processing unit 10 includes at least one of a GPS, a geomagnetic sensor, a distance sensor, and a gyro sensor (all not shown) to detect the current position (coordinates) and orientation of the host vehicle according to a known method.

B. Display

The display 20 is a display unit that displays an image guided by the display device 50. The actual configuration of the display 20 is not particularly limited. For example, a flat panel display, such as a known liquid crystal display or an organic EL display, may be used as the display 20.

C. Speaker

The speaker 30 is an output unit that outputs various voices under control of the display device 50. The actual mode of voice that is output from the speaker 30 not particularly limited. For example, a synthetic voice generated as necessary and a prerecorded voice may be output.

D. Camera

The camera 40 is a shooting unit that shoots the road surface that lies ahead in the traveling direction (hereinafter called a forward road surface) of the host vehicle. Image data shot by the camera 40 is input to a control unit 51 that will be described later. The actual configuration of the camera 40 not particularly limited. For example, the camera 40 is configured by a known imaging element such as a CMOS image sensor or a CCD image sensor or by a known optical part such as a lens or a prism.

E. Display Device

The display device 50, a display control unit that controls the display, includes a controller (e.g., the control unit 51) and a data recording unit 52.

i. Control Unit

The control unit 51 is a control unit that controls the display device 50. More specifically, the control unit 51 is a computer configured by a CPU, various programs interpreted for execution on the CPU (including basic control programs such as the OS and application programs started on the OS for executing specific functions), and an internal storage medium such as a RAM in which programs and various types of data are stored. In particular, the display program in this example is installed in the display device 50 via any storage medium or a network for effectively configuring the parts of the control unit 51. (Note: the term "storage medium" as used herein is not intended to encompass transitory signals.)

This control unit 51 functionally and conceptually includes an image acquisition unit 51a, an image recognition unit 51b, a lane structure acquisition unit 51c, a guide control unit 51d, and a display control unit 51e. The image acquisition unit 51a acquires an image imaged by the camera 40. The image recognition unit 51b recognizes the lane boundaries by analyzing an image acquired by the image acquisition unit 51a. The lane structure acquisition unit 51c acquires the lane structure at a junction that lies ahead on a traveling road. The guide control unit 51d determines a recommended lane and a guidance-message output time. The display control unit 51e displays an actual scene image on the display 20 and superimposes an arrow object on the display 20. In addition, as the remaining distance from the vehicle's current position to a junction becomes smaller, the display control unit 51e changes the shape of the arrow object such that the distance of the directional component along the travel lane becomes smaller for at least one of the travel lane part, the crossing part, and the recommended lane part.

In this example, the "lane structure" refers to the physical structure of lanes and includes the number of lanes, the lane type (through lane, right turn lane, left turn lane, etc.), lane shape, and lane positions (positions of lanes in the horizontal direction). The "travel lane" refers to a lane in which the host vehicle is currently traveling. The "recommended lane" refers to a lane most recommended for the host vehicle to travel from the current position to the destination (hereinafter simply called a "route"). For example, if there is a road (lane) on which the host vehicle is to travel after passing through a road junction located ahead of the host vehicle and if the vehicle must travel in a particular lane before passing through the junction in order to enter this road, this particular lane is the recommended lane. The "arrow object" is an arrow-shaped object displayed on the display 20 to guide the driver through a route.

ii. Data Recording Unit

The data recording unit 52 is a storage medium that records therein programs and various types of data required for the operation of the display device 50. For example, the data recording unit 52 is configured by a hard disk drive (not shown) used as an external recording device. In place of or in addition to a hard disk drive, a magnetic recording medium such as a magnetic disk, an optical recording medium such as a DVD or a blue ray disc, or any other storage medium may also be used.

This data recording unit 52 includes a map information database (in the description below, a database is called a DB). A map information DB 52a is a map information storage unit that stores map information. "Map information," information required to identify the positions of various points such as an intersection or a stop point, includes intersection data (intersection coordinates), map display data used for displaying a map on the display 20, and so on. The map information includes lane structure information. The "lane structure information" identifies the lane structure of each road.

2. Display Processing

Figure 2:
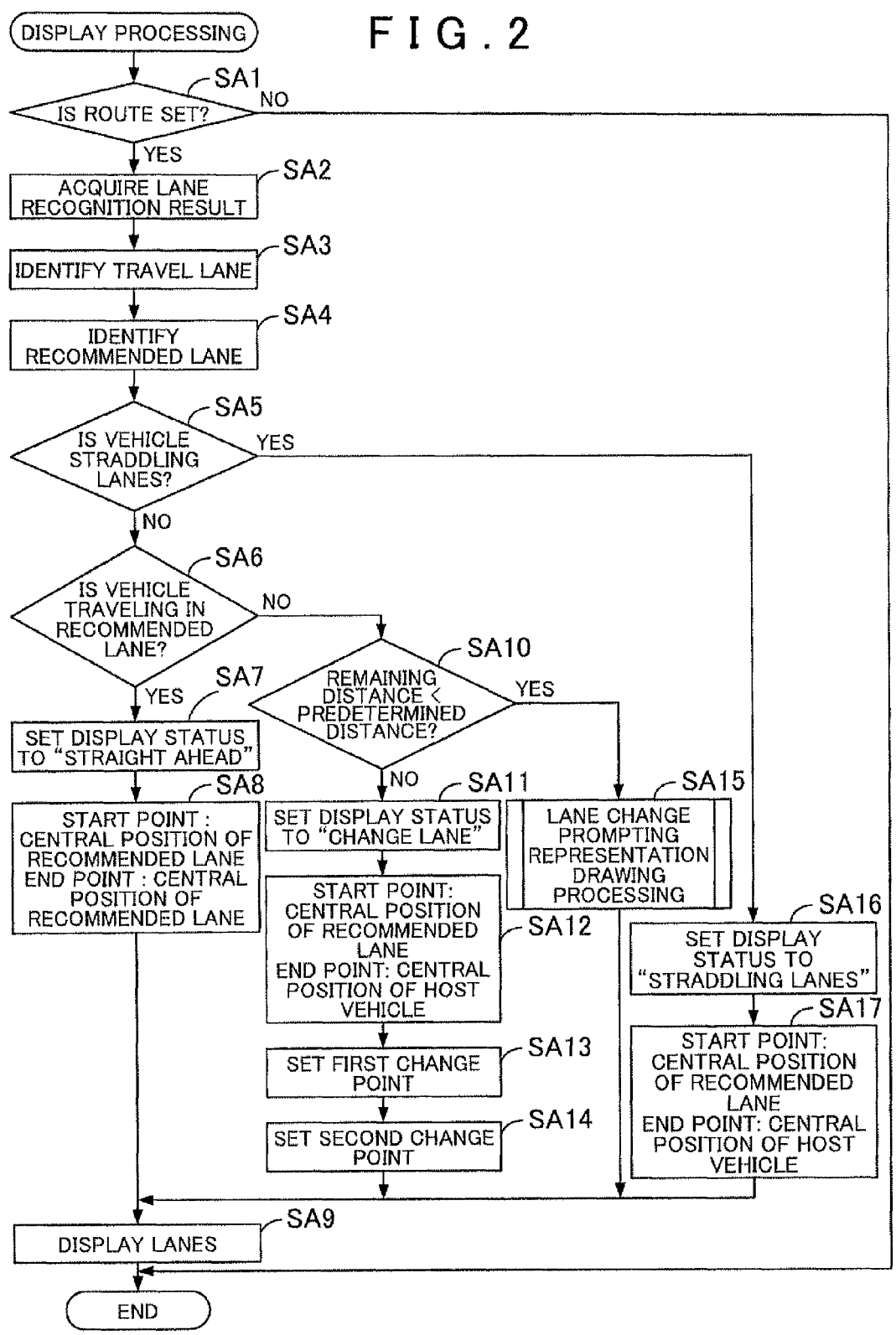
FIG. 2 is a flowchart showing an algorithm for display processing.
Figure 3:
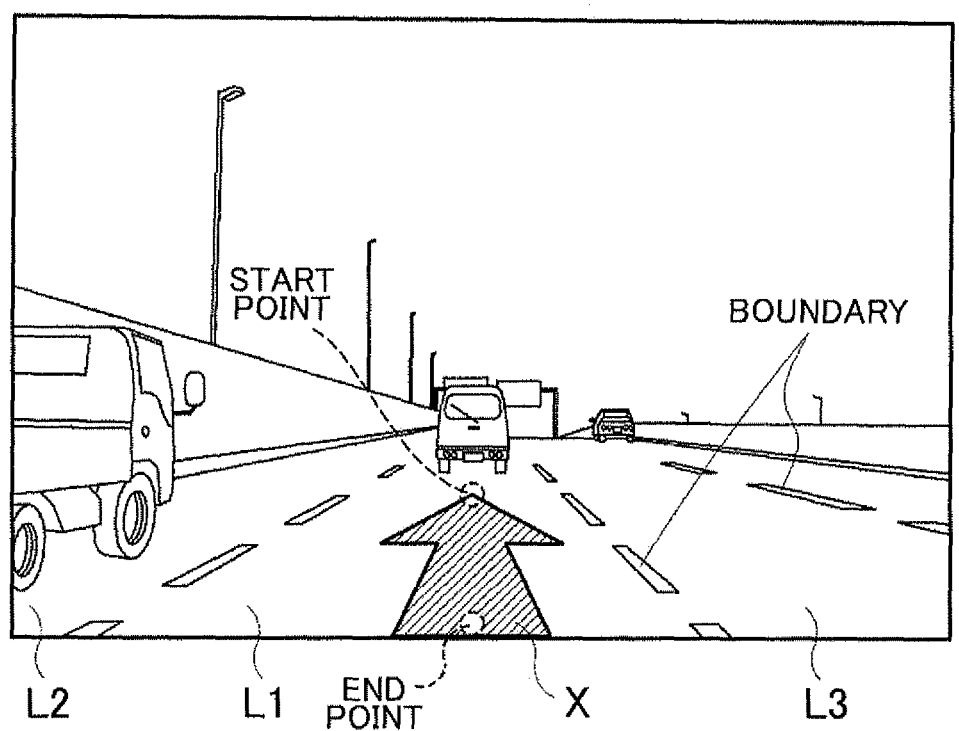
FIG. 3 is a diagram showing a display example of a route guidance arrow.
Figure 4:
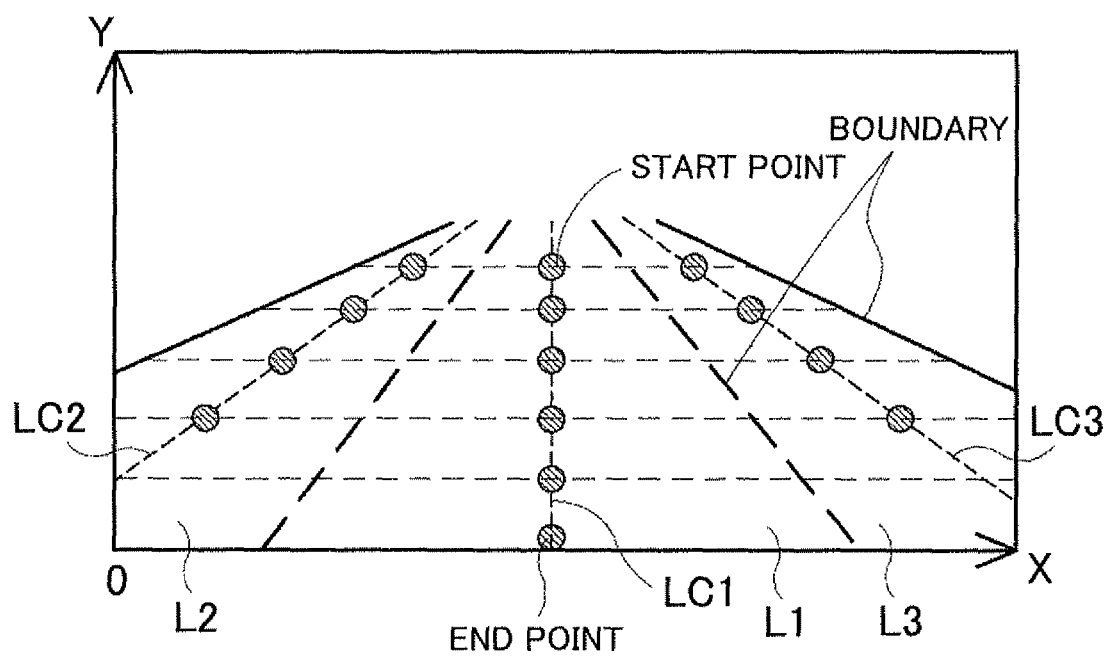
FIG. 4 is a diagram showing the concept of the drawing processing.
Figure 5:
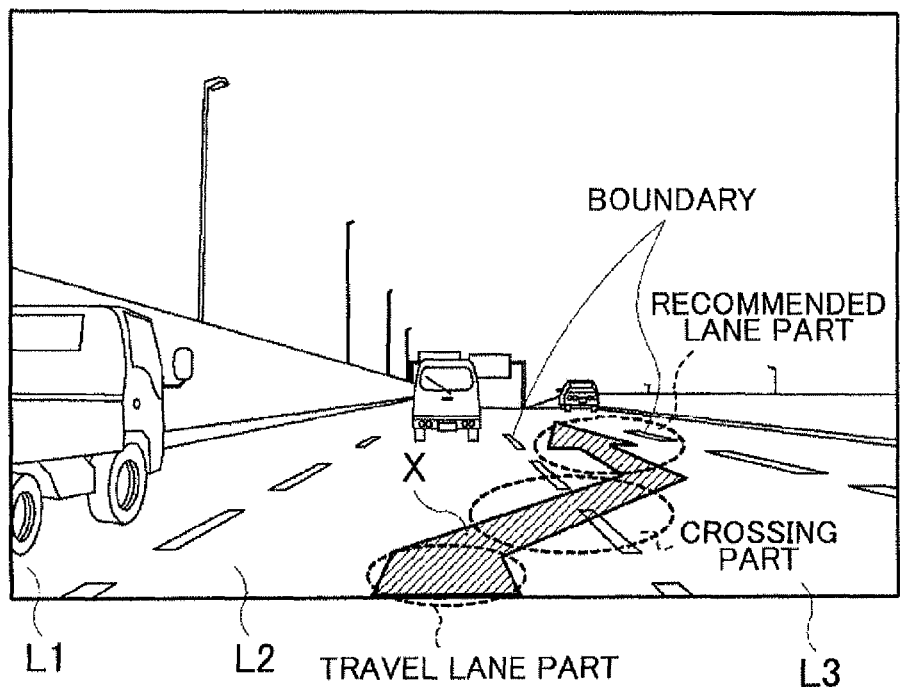
FIG. 5 is a diagram showing a display example of a route guidance arrow.
Figure 6:
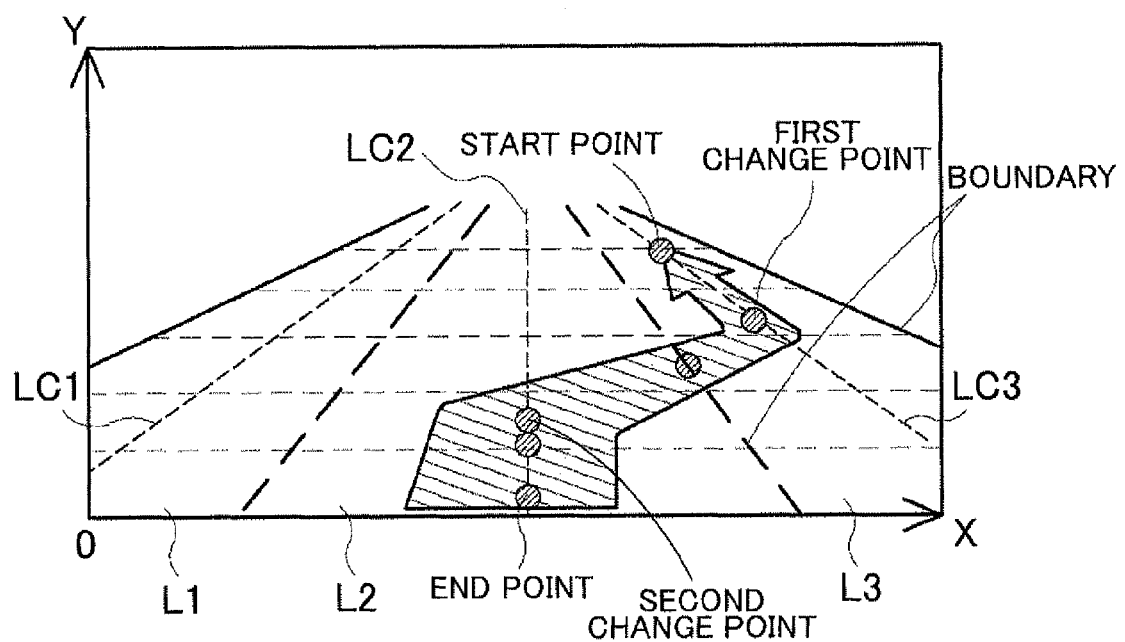
FIG. 6 is a diagram showing the concept of the drawing processing.
Figure 7:
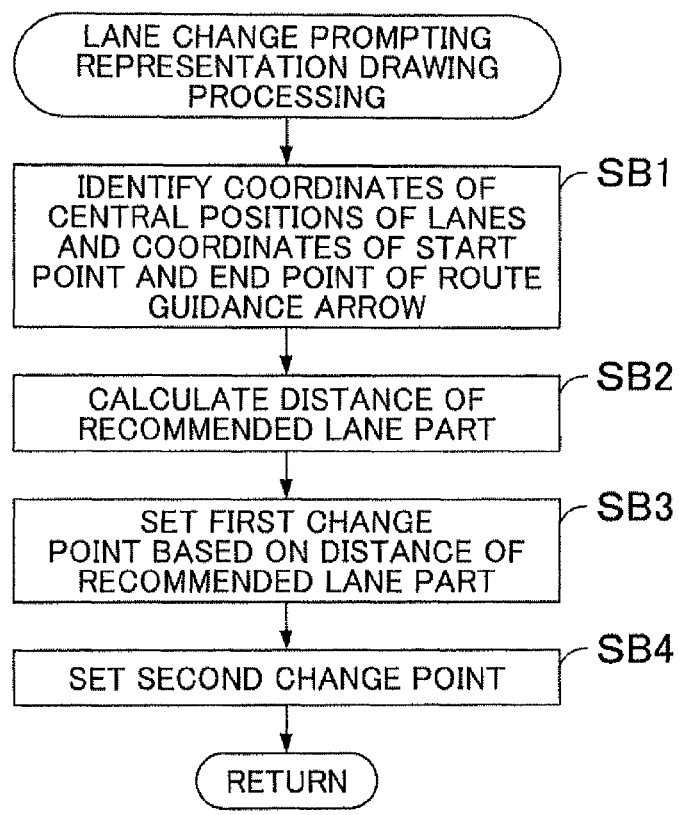
FIG. 7 is a flowchart showing an algorithm for lane change prompting representation drawing processing.

Next, the following describes a method for display processing with reference to the algorithms shown in FIGS. 2 and 7 and the diagrams in FIGS. 3-6 and 8. The algorithms may be implemented in the form of one or more computer programs stored in, for example, one or more of the storage mediums described above and executed by the control unit 51. Although the structure of the above-described display system 1 is referenced in the description of the method, the reference to such structure is exemplary, and the method need not be limited by the specific structure of the display system 1.

FIG. 2 is a flowchart showing the display processing algorithm (in the following description of processing, "step" is abbreviated "S"). This display processing superimposes an arrow object, which guides the driver about a lane change from the travel lane to a recommended lane, on the actual image of the road ahead of the vehicle. For example, this display processing is started automatically after the host vehicle starts traveling and is executed repeatedly at predetermined intervals.

First, the display control unit 51e determines whether a route is set (SA1). For example, if the input of a destination has been accepted from a driver according to a known method, the guide control unit 51d sets a route, from the host vehicle's current position acquired by the current position detection processing unit 10 to the destination accepted from the driver, according to a known method such as the Dijkstrats algorithm. If a route is not set, the display control unit 51e determines that a route is not yet set (No in SA1) and terminates the display processing considering that the arrow object need not be superimposed.

On the other hand, if a route is set (Yes in SA1), the display control unit 51e recognizes the lanes in an actual image (SA2). For example, the image acquisition unit 51a acquires an actual image shot by the camera 40, and the image recognition unit 51b analyzes the acquired actual image according to a known method and recognizes the lane boundaries included in the actual image. After that, the display control unit 51e recognizes the lanes divided by the lane boundaries.

Next, the display control unit 51e identifies the travel lane in the actual image (SA3). For example, the display control unit 51e identifies the position of the lane, which is one of the lanes included in the actual image identified in SA2 and is present in the horizontally central position (front ahead of host vehicle) in the actual image, as the position of the travel lane in the actual image.

The display control unit 51e identifies a recommended lane in the actual image (SA4). For example, the lane structure acquisition unit 51c identifies, in the map information, the position of the recommended lane relative to the travel lane based on the lane structure information and the route that is found to be set in SA1. Then, the display control unit 51e identifies the position of the recommended lane in the actual image based on the identified relative position in the map information and the position of the travel lane in the actual image identified in SA2.

After that, the display control unit 51e determines whether the host vehicle is straddling two lanes (SA5). "Straddling two lanes" means that the host vehicle is in the process of changing the lane and now on a lane boundary. For example, the display control unit 51e determines that the host vehicle is straddling two lanes if the position of one of the lane boundaries in the actual image, recognized in SA2, is within a predetermined distance (for example, 1 m) left or right from the horizontally central position of the actual image.

If the host vehicle is not straddling lanes in SA5 (No in SA5), the display control unit 51e determines whether the host vehicle is traveling in the recommended lane (SA6). For example, if the travel lane identified in SA3 matches the recommended lane identified in SA4, the display control unit 51e determines that the host vehicle is traveling in the recommended lane. If the host vehicle is traveling in the recommended lane in this manner (Yes in SA6), the display control unit 51e determines that the vehicle should travel straight ahead without changing the lanes to allow the host vehicle to travel in the recommended lane. Then, the display control unit 51e sets the display status, which is a status in the guidance display, to "straight ahead" and sets the status in the RAM, not shown, provided in the display device 50 (SA7).

Next, the display control unit 51e identifies the drawing position of the arrow object (SA8). When the display status is "straight ahead," the arrow object is drawn as a straight line that extends from the end point (The end point is the arrow object's endpoint on the host vehicle side. This term is used in the description below.) to the start point (The start point is the arrow object's endpoint on the host vehicle's traveling direction side. This term is used in the description below.) as shown in the display example in FIG. 3. Therefore, the drawing position of the arrow object is identified by identifying the coordinates of the start point and the end point.

For example, the display control unit 51e first identifies the central position of each lane. To do so, the display control unit 51e sets the axis of coordinates (X-axis in horizontal direction and Y-axis in traveling direction) on the display 20 on which the actual image acquired in SA2 is displayed and, at predetermined intervals along the Y-axis, acquires the coordinates of the positions on the lane boundaries, identified in SA2, as shown in the diagram in FIG. 4. After that, for the positions on the boundaries, the display control unit 51e finds the coordinates of each pair of the neighboring positions at the same position on the Y-axis, calculates the coordinates of the midpoint of the coordinates of the positions forming each pair, and identifies the coordinates of the central positions of each lane and the central vector of each lane configured by joining the coordinates of the central positions. In the example below, the origin of the X-Y coordinates is set in the lower-left corner of the display 20.

Next, the display control unit 51e identifies the start point of the arrow object. For example, the display control unit 51e acquires the central vector of the lane corresponding to the recommended lane identified in SA4 (that is, the vector of the recommended lane) from the central vectors of the identified lanes. After that, the display control unit 51e determines the coordinates of the intersection between the vector of the recommended lane and a horizontal line, which is set at the first default height (corresponding to default Y-coordinate), as the coordinates of the start point of the arrow object. The first default height may be set to another height according to the lane structure such as the shape of a lane curve, whether or not there is merging into or exiting from the lane.

The display control unit 51e also identifies the end point of the arrow object. For example, the display control unit 51e sets the end point of the arrow object based on the central vector of the recommended lane identified in SA4 (setting of recommended lane central position). More specifically, as with the start point of the arrow object described above, the display control unit 51c acquires the central vector of the lane, corresponding to the recommended lane identified in SA4 (that is, the vector of the recommended lane), from the central vectors of the identified lanes. After that, the display control unit 51e determines the coordinates of the intersection between the vector of the recommended lane and a horizontal line, which is set at the second default height (default Y-coordinate), as the coordinates of the end point of the arrow object. Note that the display control unit 51e sets the bottom line of the display 20 (horizontal line with Y-coordinate=0) as the second default height.

After that, the display control unit 51e displays the lanes (SA9). That is, as shown in the display example in FIG. 3, the display control unit 51e superimposes a straight arrow object determined in SA8, which extends from the end point to the start point, on the actual image recognized in SA2 and then displays the image on the display 20. After displaying the image, the display control unit 51e terminates the display processing.

On the other hand, if it is determined in SA6 that the host vehicle is not traveling in the recommended lane (No in SA6), the display control unit 51e determines whether the remaining distance from the vehicle's current position to the junction is smaller than a predetermined distance (for example, 300 m) (SA10). For example, to determine whether the remaining distance is smaller than the predetermined distance, the display control unit 51e first calculates the remaining distance based on the following two positions: vehicle's current position at that time identified by the current position detection processing unit 10 using a known method, and the position of the junction acquired from the map information DB 52a of the data recording unit 52. Then, the display control unit 51e compares the calculated remaining distance with a predetermined distance pre-set in the data recording unit 52. If the remaining distance is not smaller than the predetermined distance (No in SA10), the display control unit 51e determines that the host vehicle should change the lane from the travel lane to the recommended lane to allow the host vehicle to travel in the recommended lane. To notify the driver to change the lane, the display control unit 51e sets the display status, which is the guidance display status, to "change lane" and sets the status in the RAM, not shown, provided in the display device 50 (SA11).

Next, the display control unit 51e identifies the drawing position of the arrow object (SA12). If the display status is "change lane" (or if the display status is "straddling lanes" as will be described later), the arrow object is drawn as shown in the display example in FIG. 5 as a concatenation of the following three: the straight line in the recommended lane (hereinafter called the recommended lane part), the straight line in the travel lane (hereinafter called the travel lane part), and the straight line from the travel lane to the recommended lane (hereinafter called the crossing part). To draw the arrow object in this way, the display control unit 51e identifies the drawing position of the arrow object in SA12 by identifying the following coordinates as shown in the diagram in FIG. 6: the coordinates of the start point and the end point, the coordinates of the intersection between the crossing part and the recommended lane part (hereinafter called a first change point), and the coordinates of the intersection between the travel lane part and the crossing part (hereinafter called a second change point).

For example, the display control unit 51e identifies, as in SA8, the central position of the lanes and identifies the coordinates of the start point of the arrow object by determining the coordinates of the intersection between the vector of the recommended lane and the horizontal line setting at the first default height. The display control unit 51e sets the end point of the arrow object in a way different from that in SA8. That is, the display control unit 51e sets the end point of the arrow object based on the central vector of the travel lane identified in SA3 (setting of host vehicle central position). More specifically, the display control unit 51e acquires the central vector of the lane corresponding to the travel lane identified in SA3 (that is, the vector of the travel lane) from the central vectors of the identified lanes. After that, the display control unit 51e determines the coordinates of the intersection between the vector of the travel lane and the horizontal line, which is set at the second default height (default Y-coordinate), as the coordinates of the end point of the arrow object. Note that the display control unit 51e sets the bottom line of the display 20 (horizontal line with Y-coordinate=0) as the second default height.

Next, the display control unit 51e sets the first change point (SA13). For example, the display control unit 51e identifies the coordinates, which indicate a point on the vector of the recommended lane acquired in the same manner as in SA8 and which indicate a point located a predetermined distance from the start point (that is, the distance of the recommended lane part is a predetermined distance), as the coordinates of the first change point. The standard distance of this recommended lane part may be determined by any method. For example, to increase the visibility of the recommended lane, it is preferable that the ratio of the standard distance of the recommended lane part to the whole distance of the arrow object be higher to some extent. To satisfy this requirement, the standard distance of the recommended lane part is determined in advance as a fixed value (for example, 30 m) so that the ratio is a predetermined ratio (for example, 40%). The determined value is recorded in the data recording unit 52.

Next, the display control unit 51e sets the second change point (SA14). For example, the display control unit 51e identifies the coordinates of the second change point so that the angle θ between the straight line, which joins the first change point and the second change point, and the lane boundary on the recommended lane side of the travel lane is a predetermined angle. This predetermined angle may be determined by any method. For example, to allow the driver to easily identify between the arrow object and a lane boundary, the predetermined angle should be larger to some extent. For example, the predetermined angle θ is set to 60°.

After that the display control unit 51e displays the lanes (SA9). That is, with the arrow object superimposed on the actual image identified in SA2, the display control unit 51e displays the image on the display 20. This arrow object is configured by the recommended lane part extending from the start point to the first change point, the crossing part extending from the first change point to the second change point, and the travel lane part extending from the second change point to the end point, wherein the start point, end point, first change point, and second change point are determined in SA12-SA14. After displaying the lanes as described above, the display control unit 51e terminates the display processing.

A. Lane Change Prompting Representation Drawing Processing

On the other hand, if the remaining distance from the vehicle's current position to the junction is smaller than a predetermined distance in SA10 (Yes in SA10), the lane change prompting representation drawing processing is started. FIG. 7 is a flowchart showing a lane change prompting representation drawing processing algorithm. This processing is drawing processing to prompt a driver to change the lane from a travel lane to a recommended lane as soon as possible.

First, the display control unit 51e identifies the coordinates of the central positions of the lanes and the coordinates of the start point and the end point of the arrow object (SB1). The display control unit 51e identifies the coordinates of the central positions of the lanes and the start point and the end point of the arrow object in the same manner as in SA12.

Next, the display control unit 51e sets the first change point. To do so, the display control unit 51e first calculates the distance M of the recommended lane part according to the expression (1) given below (SB2). After that, the display control unit 51e sets a point, which is on the central vector of the recommended lane and is away from the start point, identified in SB1, toward the host vehicle side by the calculated distance of the recommended lane part, as the first change point (SB3).

$$M = T + \frac{t}{L} \quad (1)$$

where T is the standard distance of recommended lane part,
t is a constant satisfying t>0, and
L is the remaining distance.

If the Y-coordinate of the first change point that is set according to the expression above is smaller than the Y-coordinate of the second change point, the crossing part of the arrow object is drawn as an oblique line that returns, in front of the vehicle, from a point far from the vehicle to a point near the vehicle. This representation is not preferable because it does not visually match the image that a vehicle is traveling forward. To prevent this situation, it is preferable that the minimum value of L be set to a fixed value (for example, 1 m) in the expression above and that, if the actual remaining distance is smaller than 1, the value of L remain set to the fixed value (for example, remain set to 1 m) to prevent the distance of the recommended lane part from being too large. The maximum value of the distance of the recommended lane part is set to a value that satisfies the condition "the Y-coordinate of the first change point is equal to the Y-coordinate of the second change point." It is preferable that the constant t be set to a value so that the maximum value of the distance of the recommended lane part satisfying the above-described condition is T+t."

After calculating the distance of the recommended lane part as described above, the display control unit 51e sets a point, which is on the central vector of the recommended lane and is away from the start point, identified in SB1, toward the host vehicle side by the calculated distance of the recommended lane part, as the first change point (SB3). After that, the display control unit 51e sets the second change point in the same manner as in SA14 (SB4) and terminates the lane change prompting representation drawing processing. After that, control returns to the display processing in FIG. 2, where the display control unit 51e displays the lanes (SA9). After displaying the lanes, the display control unit 51e terminates the display processing.

Figure 8:
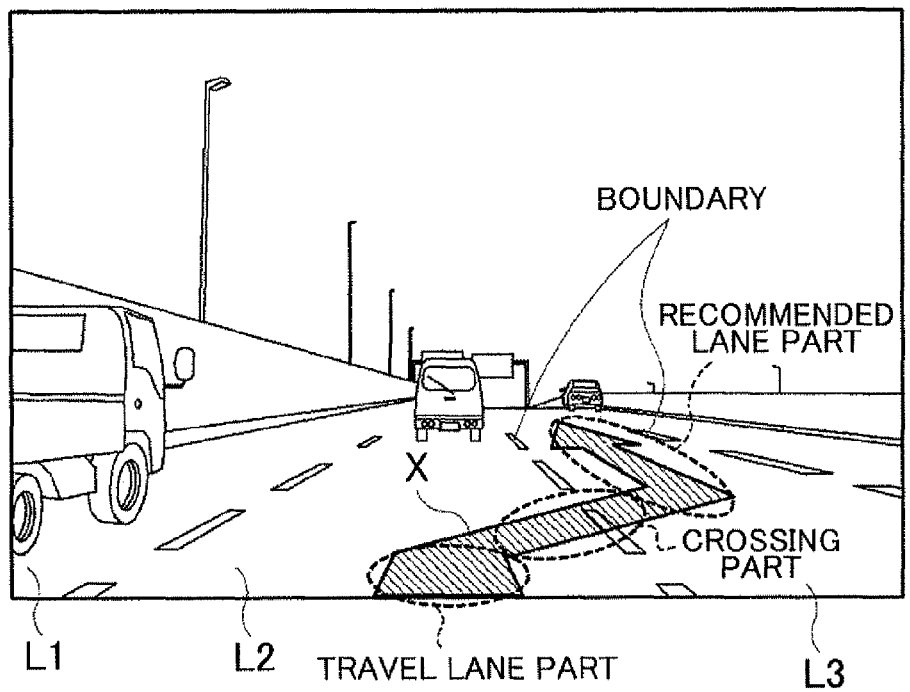
FIG. 8 is a diagram showing a display example of the route guidance arrow after the lane change prompting representation drawing processing.

FIG. 8 is a diagram showing a display example of the superimposed display of the arrow object on the actual image. The comparison between the display example in FIG. 8 and the display example in FIG. 5 indicates that the shape of the arrow object is changed in at least one of the travel lane part, the crossing part, and the recommended lane part such that the distance of the directional component along the travel lane (distance of the component along the central vector of the travel lane) is shortened. More specifically, though the recommended lane part becomes larger as the remaining distance becomes smaller, the coordinates of the start point and the coordinates of the end point remain the same in this example regardless of the remaining distance. This results in that the total distance of the directional components along the travel lane for the travel lane part and the crossing part becomes smaller. Because the coordinates of the start point and the coordinates of the end point remain the same regardless of the remaining distance just as described, the total distance of the directional components along the travel lane for the travel lane part, the crossing part, and the recommended lane part does not change but remains the constant distance. Setting the first change point in this manner causes the first change point to move toward the vehicle's current position along the central vector of the recommended lane in which the first change point is present. The display processing, if repeated in the same manner until the host vehicle arrives at the destination, causes the lane change prompting representation drawing processing to be repeated if the travel lane is not the recommended lane and the remaining distance is equal to or smaller than a predetermined distance. In this manner, the first change point gradually moves toward the vehicle's current position along the central vector of the recommended lane with the result that the recommended lane part gradually becomes larger. This display processing gives a driver a visual impression that the arrow object is approaching the host vehicle and allows the driver to intuitively understand that the vehicle is approaching the junction, thus prompting the driver to change the lane.

On the other hand, if the host vehicle is straddling lanes in SA5 in FIG. 2 (Yes in SA5), the display control unit 51e sets the display status to "straddling lanes" and sets the status in the RAM, not shown, provided in the display device 50 (SA16).

Next, the display control unit 51e identifies the drawing position of the arrow object. When the display status indicates "straddling lanes," the arrow object is drawn as a straight line extending from the end point to the start point. To draw this straight line, the display control unit 51e identifies the drawing position of the arrow object by identifying the coordinates of the start point and the coordinates of the end point. The display control unit 51e identifies those coordinates as in SA12. In this case, the tip of the arrow object may be drawn as the recommended lane part, extending from the start point to the first change point, as in SA9. After that, the display control unit 51e terminates the display processing.

3. Effect

According to this example, the shape of the arrow object is changed such that, as the remaining distance from the vehicle's current position to the junction becomes smaller, the distance of the directional component along the travel lane is shortened for at least one of the travel lane part, the crossing part, and the recommended lane part. Therefore, as the remaining distance becomes smaller, the arrow object is displayed such that the travel lane part, the crossing part, or the recommended lane part becomes smaller. This display processing gives a driver a visual impression that the arrow object is approaching the host vehicle and allows the driver to intuitively understand that the vehicle is approaching the junction, thus prompting the driver to change the lane.

The shape of the arrow object is changed such that, as the remaining distance becomes smaller, the distance of the directional component along the travel lane is shortened for the travel lane part and the crossing part. Therefore, as the remaining distance becomes smaller, this display processing gives a driver a visual impression that the arrow object is approaching the host vehicle and allows the driver to intuitively understand that the vehicle is approaching the junction, thus prompting the driver to change the lane.

The shape of the arrow object is changed such that, even if the remaining distance becomes smaller, the total distance of the directional components along the travel lane for the travel lane part, the crossing part, and the recommended lane part does not change. Therefore, as the remaining distance becomes smaller, this display processing displays the arrow object such that, the travel lane part or the crossing part becomes smaller and, in addition, the recommended lane part becomes larger, thereby allowing a driver to more intuitively understand that the vehicle is approaching the junction.

The shape of the arrow object is changed such that, as the remaining distance becomes smaller, at least one of the start point, the first change point, and the second change point moves toward the vehicle's current position. Therefore, as the remaining distance becomes smaller, this display processing gradually makes the whole arrow smaller and changes the intersection angle between the lane boundary and the crossing part, thereby allowing a driver to more intuitively understand that the vehicle is approaching the junction.

4. Exemplary Modifications

The problems to be solved by the inventive principles discussed above and the effect of these principles are not limited to those described above but may vary according to the implementation environment or the detail of the configuration. The inventive principles may be applied to only a part of the problems described above or achieves only a part of the effect described above. For example, even if a driver may not intuitively understand that the host vehicle approaches a junction but if the driver can understand more easily, or can understand to the same extent as before via a technology different from conventional technologies, that the host vehicle approaches a junction, a problem is solved.

It should be noted that the electrical components described above are functional and conceptual components that need not be always be configured physically as shown in the figures. That is, a specific mode of the distribution or integration of the units is not limited to that shown in the figures. Instead, the whole or a part of the units may be distributed or integrated functionally or physically in any number of units according to the various loads or the usage status. For example, the components of the display system 1, which are distributed, may be interconnected via a network.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, in the above example, the travel lane part or the crossing part is drawn in the lane change prompting representation drawing processing such that the distance of the directional component along the travel lane is small. Instead, the recommended lane part may also be drawn such that the distance of its directional component along the travel lane part is small. In the above example, the shape of the arrow object is changed such that, even if the remaining distance becomes smaller, the total distance of the directional components along the travel lane for the travel lane part, the crossing part, and the recommended lane part is not changed. Instead of this, the shape of the arrow object may also be changed such that the total distance is changed. In the example described above, the shape of the arrow object is changed such that the first change point moves in the direction toward the vehicle's current position along the central vector of the recommended lane in which the first change point is present. Instead of this, the shape of the arrow object may also be changed such that the second change point moves in the direction toward the vehicle's current position along the central vector of the travel lane in which the second change point is present.

What is claimed is:

1. A display system for generating and displaying an arrow object superimposed on an actual image of a road ahead of a vehicle, the display system comprising:
    a controller that:
        accesses information about a lane change route for guiding the vehicle when changing from a travel lane to a recommended lane, the travel lane being a lane in which the vehicle is currently traveling, the recommended lane being a lane that allows the vehicle to enter a lane in which the vehicle is to travel after passing through a road junction ahead of the vehicle;

generates and displays a travel lane part of the arrow object, the travel lane part being displayed as a superimposed image on the travel lane;

generates and displays a crossing part of the arrow object the crossing lane part being displayed as a superimposed image traversing from the travel lane to the recommended lane;

generates and displays a recommended lane party of the arrow object, the recommended arrow lane part being displayed as a superimposed image on the recommended lane; and changes a shape of the displayed arrow object such that, as a remaining distance from a current position of the vehicle to the junction becomes smaller, a total distance of a directional component along the travel lane for the travel lane part and a directional component along the travel lane for the crossing part is shortened while a total distance of the directional component along the travel lane for the travel lane part, the directional component along the travel lane for the crossing part, and a directional component along the travel lane for the recommended lane part does not change.

2. The display system according to claim 1, wherein the controller: changes the shape of the arrow object such that, as the remaining distance becomes smaller, at least one of a start point, a first change point, and a second change point moves closer toward the current position of the vehicle along a central vector of the travel lane or the recommended lane in which each of the points is present, the start point being a farthest point from the current position of the vehicle in the recommended lane part, the first change point being an intersection between the crossing part and the recommended lane part, and the second change point being an intersection between the travel lane part and the crossing part.

3. The display system according to claim 1, wherein the controller:

determines a present position of the vehicle; and determines the lane change route based on the present position of the vehicle and the lane in which the vehicle is to travel after passing through the road junction.

4. A display method for generating and displaying an arrow object superimposed on an actual image of a road ahead of a vehicle, comprising:

accessing, by a controller, information about a lane change route for guiding the vehicle when changing from a travel lane to a recommended lane, the travel lane being a lane in which the vehicle is currently traveling, the recommended lane being a lane that allows the vehicle to enter a lane in which the vehicle is to travel after passing through a road junction ahead of the vehicle;

generating and displaying, by the controller, a travel lane part of the arrow object, the travel lane part being displayed as a superimposed image on the travel lane;

generating and displaying, by the controller, a crossing part of the arrow object the crossing lane part being displayed as a superimposed image traversing from the travel lane to the recommended lane;

generating and displaying, by the controller, a recommended lane part of the arrow object, the recommended arrow lane part being displayed as a superimposed image on the recommended lane; and changing, by the controller, a shape of the displayed arrow object such that, as a remaining distance from a current position of the vehicle to the junction becomes smaller, a total distance of a directional component along the travel lane for the travel lane part and a directional component along the travel lane for the crossing part is shortened while a total distance of the directional component along the travel lane for the travel lane part, the directional component along the travel lane for the crossing part, and a directional component along the travel lane for the recommended lane part does not change.

5. The display method according to claim 4, further comprising:

changing, by the controller, the shape of the arrow object such that, as the remaining distance becomes smaller, at least one of a start point, a first change point, and a second change point moves closer toward the current position of the vehicle along a central vector of the travel lane or the recommended lane in which each of the points is present, the start point being a farthest point from the current position of the vehicle in the recommended lane part, the first change point being an intersection between the crossing part and the recommended lane part, and the second change point being an intersection between the travel lane part and the crossing part.

6. The display method according to claim 4, further comprising:

determining, by the controller, a present position of the vehicle; and determining, by the controller, the lane change route based on the present position of the vehicle and the lane in which the vehicle is to travel after passing through the road junction.

7. A non-transitory computer-readable storage medium storing a computer-executable display program usable to generate and display an arrow object superimposed on an actual image of a road ahead of a vehicle, the program comprising:

instructions for accessing information about a lane change route for guiding the vehicle when changing from a travel lane to a recommended lane, the travel lane being a lane in which the vehicle is currently traveling, the recommended lane being a lane that allows the vehicle to enter a lane in which the vehicle is to travel after passing through a road junction ahead of the vehicle;

instructions for generating and displaying a travel lane part of the arrow object, the travel lane part being displayed as a superimposed image on the travel lane;

instructions for generating and displaying a crossing part of the arrow object the crossing lane part being displayed as a superimposed image traversing from the travel lane to the recommended lane;

instructions for generating and displaying a recommended lane part of the arrow object, the recommended arrow lane part being displayed as a superimposed image on the recommended lane; and instructions for changing a shape of the displayed arrow object such that, as a remaining distance from a current position of the vehicle to the junction becomes smaller, a total distance of a directional component along the travel lane for the travel lane part and a directional component along the travel lane for the crossing part is shortened while a total distance of the directional component along the travel lane for the travel lane part, the directional component along the travel lane for the crossing part, and a directional component along the travel lane for the recommended lane part does not change.

8. The storage medium according to claim 7, the program further comprising: instructions for changing the shape of the arrow object such that, as the remaining distance becomes smaller, at least one of a start point, a first change point, and a second change point moves closer toward the current position of the vehicle along a central vector of the travel lane or the recommended lane in which each of the points is present, the start point being a farthest point from the current position of the vehicle in the recommended lane part, the first change point being an intersection between the crossing part and the recommended lane part, and the second change point being an intersection between the travel lane part and the crossing part.

9. The storage medium according to claim 7, the program further comprising: instructions for determining a present position of the vehicle; and instructions for determining the lane change route based on the present position of the vehicle and the lane in which the vehicle is to travel after passing through the road junction.

10. A display system for generating and displaying an arrow object superimposed on an actual image of a road ahead of a vehicle, the display system comprising:

a controller that:
   accesses information about a lane change route for guiding the vehicle when changing from a travel lane to a recommended lane, the travel lane being a lane in which the vehicle is currently traveling, the recommended lane being a lane that allows the vehicle to enter a lane in which the vehicle is to travel after passing through a road junction ahead of the vehicle;
   generates and displays a travel lane part of the arrow object, the travel lane part being displayed as a superimposed image on the travel lane;
   generates and displays a crossing part of the arrow object the crossing lane part being displayed as a superimposed image traversing from the travel lane to the recommended lane;
   generates and displays a recommended lane part of the arrow object, the recommended arrow lane part being displayed as a superimposed image on the recommended lane; and
   changes a shape of the displayed arrow object such that, as a remaining distance from a current position of the vehicle to the junction becomes smaller, a distance of a directional component along the travel lane for the recommended part is lengthened and a total distance of a directional component along the travel lane for the travel lane part, a directional component along the travel lane for the crossing part, and the directional component along the travel lane for the recommended lane part does not change.

* * * * *